US 11,755,739 B2

United States Patent
Jeansonne et al.

(10) Patent No.: US 11,755,739 B2
(45) Date of Patent: Sep. 12, 2023

(54) UPDATE SIGNALS

(71) Applicant: Hewlett-Packard Development Company, L.P., Spring, TX (US)

(72) Inventors: Jeffrey Kevin Jeansonne, Spring, TX (US); Wei Ze Liu, Spring, TX (US); Srinath Balaraman, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 114 days.

(21) Appl. No.: 17/288,548

(22) PCT Filed: May 15, 2019

(86) PCT No.: PCT/US2019/032360
§ 371 (c)(1),
(2) Date: Apr. 25, 2021

(87) PCT Pub. No.: WO2020/231418
PCT Pub. Date: Nov. 19, 2020

(65) Prior Publication Data
US 2022/0067162 A1 Mar. 3, 2022

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC ... G06F 21/57; G06F 21/572; G06F 2221/033
See application file for complete search history.

(56) References Cited

U.S. PATENT DOCUMENTS

| 6,976,163 B1 | 12/2005 | Hind et al. |
| 7,017,040 B2 | 3/2006 | Singer et al. |

(Continued)

FOREIGN PATENT DOCUMENTS

| CN | 105468978 A | 4/2016 |
| CN | 106168899 A | 11/2016 |

(Continued)

OTHER PUBLICATIONS

V. Bashun, A. Sergeev, V. Minchenkov and A. Yakovlev, "Too young to be secure: Analysis of UEFI threats and vulnerabilities," 14th Conference of Open Innovation Association FRUCT, Espoo, Finland, 2013, pp. 16-24, doi: 10.1109/FRUCT.2013.6737940. (Year: 2013).*

(Continued)

*Primary Examiner* — Michael Simitoski
(74) *Attorney, Agent, or Firm* — Knobbe, Martens, Olson & Bear, LLP

(57) ABSTRACT

An example of a first computing device may include firmware, a controller, and a processor. The processor may be to generate a trust state message, to be sent to the controller, indicating the firmware of the first computing device is operating a trusted environment and utilize the firmware to validate an update within the trusted environment. The controller may be to assert, responsive to receiving the trust state message, a trust state signal to a second computing device indicating the firmware of the first computing device is operating the trusted environment The assertion of the trust state signal may be to enable the second computing device to install the validated update.

13 Claims, 4 Drawing Sheets

(56) References Cited

U.S. PATENT DOCUMENTS

| | | | | |
|---|---|---|---|---|
| 9,218,178 | B2* | 12/2015 | Young | G06F 21/572 |
| 9,483,246 | B2 | 11/2016 | Prakash et al. | |
| 10,860,305 | B1* | 12/2020 | Harland | H03K 19/177 |
| 2005/0021968 | A1 | 1/2005 | Zimmer et al. | |
| 2006/0200813 | A1* | 9/2006 | Young | G06F 8/65 |
| | | | | 717/168 |
| 2008/0060068 | A1* | 3/2008 | Mabayoje | G06F 21/31 |
| | | | | 726/9 |
| 2013/0276128 | A1* | 10/2013 | Konetski | G06F 21/10 |
| | | | | 726/26 |
| 2013/0290740 | A1* | 10/2013 | Ziarnik | G06F 9/4411 |
| | | | | 713/300 |
| 2013/0339938 | A1* | 12/2013 | He | G06F 8/654 |
| | | | | 717/168 |
| 2014/0310509 | A1 | 10/2014 | Potlapally et al. | |
| 2015/0067309 | A1* | 3/2015 | Dasari | G06F 9/445 |
| | | | | 713/1 |
| 2015/0113258 | A1* | 4/2015 | Grieco | G06F 21/572 |
| | | | | 713/2 |
| 2016/0147540 | A1* | 5/2016 | Chiu | G06F 13/4282 |
| | | | | 713/2 |
| 2017/0010875 | A1 | 1/2017 | Martinez et al. | |
| 2017/0220802 | A1 | 8/2017 | Huang et al. | |
| 2017/0322790 | A1* | 11/2017 | Surdu | H04L 63/123 |
| 2017/0325088 | A1* | 11/2017 | Newham | H04W 12/33 |
| 2017/0372076 | A1* | 12/2017 | Poornachandran | H04L 9/3268 |
| 2018/0089435 | A1* | 3/2018 | Zander | G06F 21/575 |
| 2018/0096154 | A1 | 4/2018 | Shivanna et al. | |
| 2018/0157484 | A1* | 6/2018 | Mi | G06F 8/65 |
| 2018/0165455 | A1* | 6/2018 | Liguori | G06F 21/575 |
| 2018/0330093 | A1* | 11/2018 | Shivanna | G06F 9/4401 |
| 2019/0042229 | A1 | 2/2019 | Kotary et al. | |
| 2019/0042230 | A1* | 2/2019 | Dewan | G06F 21/57 |
| 2019/0042753 | A1* | 2/2019 | Jreij | G06F 21/575 |
| 2019/0251266 | A1* | 8/2019 | Tuttle | G06F 21/55 |
| 2019/0391799 | A1* | 12/2019 | Samuel | G06F 1/266 |
| 2020/0082090 | A1* | 3/2020 | Samuel | G06F 8/654 |
| 2020/0151336 | A1* | 5/2020 | Maletsky | G06F 21/575 |
| 2020/0193029 | A1* | 6/2020 | Liu | H04L 9/3234 |
| 2020/0218527 | A1* | 7/2020 | Ganesan | G06F 8/65 |
| 2020/0341744 | A1* | 10/2020 | Suryanarayana | G06F 8/65 |
| 2020/0356357 | A1* | 11/2020 | Narasimhan | G06F 15/167 |
| 2022/0137947 | A1* | 5/2022 | Jang | G06F 8/71 |
| | | | | 717/169 |

FOREIGN PATENT DOCUMENTS

| | | | |
|---|---|---|---|
| CN | 107682159 A | 2/2018 | |
| CN | 104572168 | 6/2018 | |
| EP | 2339494 A1 | 6/2011 | |
| EP | 3440585 B1 * | 4/2021 | G06F 21/572 |
| WO | WO-2018/039027 A1 | 3/2018 | |
| WO | WO-2019057810 | 3/2019 | |

OTHER PUBLICATIONS

K. Zandberg, K. Schleiser, F. Acosta, H. Tschofenig and E. Baccelli, "Secure Firmware Updates for Constrained IoT Devices Using Open Standards: A Reality Check," in IEEE Access, vol. 7, pp. 71907-71920, 2019, doi: 10.1109/ACCESS.2019.2919760. (Year: 2019).*

* cited by examiner

UPDATE SIGNALS

BACKGROUND

A computing device may include instructions executable by a processor to perform various functions of the computing device. The instructions may be subject to updates. The instructions may be the subject of attacks by malware in the computing device or from other computing devices. In some examples, the attacks may be perpetrated during or disguised as an update.

DETAILED DESCRIPTION

Figure 1:
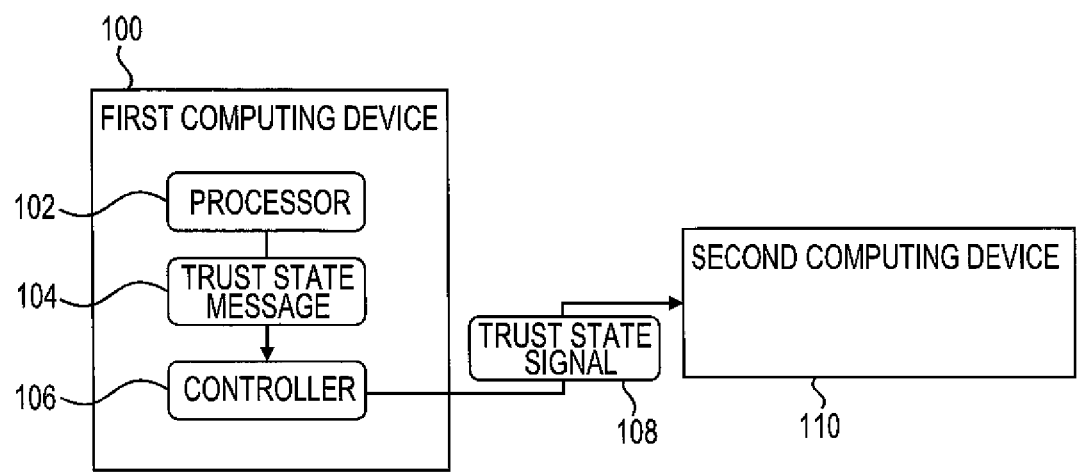
FIG. 1 illustrates an example of a first computing device utilizing update signals consistent with the present disclosure.

A computing device may include instructions executable by a processing resource to perform various functions. An example of such functions includes various startup functions of the computing system. The instructions may include firmware instructions. The firmware instructions may include boot firmware such as Basic Input/Output System (BIOS) instructions. The BIOS instructions may include unified extensible firmware interface (UEFI) specification instructions.

The firmware instructions may include the instructions executed by a processing resource of a computing device when powered on. The firmware instructions may be executed to perform a booting up operation of the computing device. For example, the firmware instructions may identify, test, and/or initialize hardware associated with the computing device. The firmware instructions may configure the computing device to a particular state such that the other instructions, such as an operating system (OS) may be loaded and executed to control the computing device.

Malware attacks on instructions, such as firmware instructions, used to perform startup functions of a computing device may cause the integrity of the computing device to be compromised such that unauthorized access and operations in the computing device may occur. Compromised firmware instructions may include instructions that have been corrupted such that the firmware instructions are not executable and/or have been changed in some wat but are still executable. For example, compromised firmware instructions may include firmware instructions that have been modified in a manner that may allow undesired remote monitoring and/or control of the computing device by a malicious entity, unauthorized access and/or modification of data associated with the computing device by malware, disablement of the computing device, etc. Consequently, validation of instructions being may be performed prior to installation of the instructions on a computing device.

Validation of the instructions may include a cryptographic-based verification technique. For example, the validation of the instructions may employ a cryptographic encryption using public and private keys to validate a digital signature included in the instructions by the author/distributor. As used herein, a public key may refer to a key that is known to multiple entities and a private key may refer to a key that is known to a single entity or a limited number of entities. Data, such as a digital signature associated with instructions, encrypted with a private key may be decrypted using the corresponding public key. This underlying concept may be utilized in digital signature generation and verification. For example, a digital signature may be decrypted and verified as genuine in order to deem the associated instructions as valid.

In some examples, computing devices may include a crypto-engine and/or a cryptographic accelerator. As used here, a crypto-engine and/or cryptographic accelerator may include instructions and/or hardware embedded in a computing device and utilizable to cryptographically verify instructions prior to installation. For example, a crypto-engine and/or cryptographic accelerator may include dedicated resources, such as instructions or hardware that are dedicated to and/or reserved for utilization to perform cryptographic-based validations of instructions. For example, a crypto-engine and/or cryptographic accelerator may include a secure crypto-processor that is a dedicated processor for carrying our cryptographic operations. The crypto-engine and/or cryptographic accelerator may be a component of, embedded in, and/or utilize resources of a computing device that is to install the instructions.

However, instructions and/or hardware to carryout cryptographic operations may impose a computational cost and/or an additional monetary cost to a computing device. That is, the inclusion of a crypto-engine and/or cryptographic accelerator may increase the cost and/or decrease the computational capacity of a computing device. However, removing the instructions and/or hardware to carryout cryptographic operations at a computing device may leave the computing device vulnerable to attack. For example, since the computing device is unable to validate the authenticity of instructions received to install as part of an update.

In contrast, examples consistent with the present disclosure may include a mechanism to secure updates on a computing device without a capability to perform validation of firmware instruction updates. That is, examples consistent with the present disclosure may validate a firmware instruction update to a computing device without a crypto-engine and/or cryptographic accelerator. For example, examples consistent with the present disclosure may include a first computing device. The first computing device may include firmware, a controller, and a processor. The processor may be a processor to generate a trust state message, to be sent to the controller, indicating the firmware of the first computing device is operating a trusted environment and utilize the firmware to validate an update within the trusted environment. The controller may be a controller to assert, responsive to receiving the trust state message, a trust state signal to a second computing device indicating the firmware of the first computing device is operating the trusted environment, wherein the assertion of the trust state signal is to enable the second computing device to install the validated update.

FIG. 1 illustrates an example of a first computing device 100 utilizing update signals consistent with the present disclosure. The described components and/or operations of the first computing device 100 may include and/or be interchanged with the described components and/or operations described in relation to FIGS. 2-4.

The first computing device 100 may include a processor 102. The processor 102 may include a processor 102 to execute machine-readable instructions to perform various operations. The instructions may be stored in a memory resource such as a non-transitory machine-readable memory medium for storing machine-readable instructions. In some examples, the machine-readable instructions may be stored on a non-volatile ROM chip or flash memory chip on a motherboard of the first computing device 100.

The machine-readable instructions executable by the processor 102 to perform operations may include firmware instructions. For example, the firmware may include a Basic Input/Output System (BIOS). The firmware may include instructions that load upon a startup of the first computing device 100 and is responsible for initializing and/or formatting the various hardware components of the computing device 100 and making sure that they are functioning properly. The firmware may run a bootloader that boots an operating system (OS) installed on the first computing device 100.

In some examples, the firmware may include a unified extensible firmware interface (UEFI) based firmware. UEFI based firmware may be installed on the first computing device 100 at the time of manufacturing and it may be the first set of instructions executed when the first computing device 100 is powered on. The UEFI based firmware may include firmware that replaces the functionality of the standard BIOS. The UEFI based firmware may check to see what hardware components the computing device 100 has, initialize and/or format the components, and hand them over to the OS.

The UEFI based firmware may include a secure boot feature. For example, the UEFI based firmware may include a feature that validate each component loaded during the boot process of the first computing device 100. Validating each component may include ensuring that each component is digitally signed and validated. In this manner, it may be ensured that the first computing device 100 boots utilizing software that is trusted by the manufacturer of the first computing device 100 and/or by a user of the first computing device 100.

The validation of each one of the components may be performed against trusted certificates or hashes present in the UEFI based firmware. For example, these certificates and/or hashes may establish a hierarchy of trust utilizing keys. For example, a platform key (PK) may represent a root of trust and may be utilized to protect a Key Exchange Key (KEK) database. A vendor may release a public portion of the PK into UEFI based firmware during manufacturing. A private portion of the PK, however, may stay with the vendor. When updating the PK, the new PK certificate may be signed with the old one. The KEK database may contain trusted certificates that are allowed to modify an allowed signature database (database of certificates or their hashes that were used to generate code-signing certificates used to sign bootloader and other pre-boot components and that are permitted for execution), disallowed signature database (database of certificates or their hashes that were hat were compromised and/or revoked and that are denied from execution), or time stamp signature database (database containing timestamping certificates utilized when signing bootloader images). The KEK database may contain certificates of operating system vendors and may be secured by the PK.

The processor 102 may execute the firmware instructions to validate an update to be applied to the first computing device 100. For example, the processor 102 of the first computing device 100 may execute the UEFI based firmware in order to verify a digital signature of an update to be applied to the machine-readable instructions, including the firmware instructions, loaded to the first computing device 100.

The first computing device 100 may include a host device. A host device may include a first computing device 100 that may be a computing device, in a network or other system including a plurality of computing devices, to initially receive an update to be applied to machine readable instructions. For example, the host device may include a first computing device 100 that will distribute the machine-readable instruction update to other computing devices. Additionally, or alternatively, the host device may include a first computing device 100 that will authorize the distribution of machine-readable instruction update to other computing devices. As such, a first computing device 100 may be communicably coupled to a second computing device 110.

A second computing device 110 may include a computing device that receives the update and/or a permission to install the update from the first computing device 100. That is, the second computing device 110 may rely on the first computing device 100 to provide the second computing device 110 with access to and/or permission to access an upgrade for installation at the second computing device 110. The first computing device 100 and the second computing device 110 may be members or nodes of a computing network. In an example, the first computing device 100 may include an administrative or control node in the network and the second computing device 110 may include a non-administrative or subservient node in the network.

The second computing device 110 may rely on the first computing device 100 to validate an update on behalf of the second computing device 110. That is, the second computing device 110 may rely on the first computing device 100 to verify a digital signature of an update in accord with the examples described below.

As described above, the first computing device 100 may include a processor 102. The processor 102 may execute machine-readable instructions to perform various operations. For example, the processor 102 may execute firmware instructions. The processor 102 may execute firmware instructions that cause the first computing device 100 to operate a trusted environment. Operating a trusted environment may include initializing a power on self-test (POST) and loading a UEFI based firmware to perform a secure boot. When operating in the trusted environment, a chain of trust may be established, and machine-readable instructions may be validated prior to execution by the first computing device 100. The processor 102 may, by executing the firmware of the first computing device 100, open a trusted window to perform the validation in, thereby establishing the chain of trust. Operating within the trusted environment may enable the first computing device 100 to validate firmware and/or firmware upgrades to prevent against replacement attacks by verifying their respective digital signatures.

The processor 102 may generate a trust state message 104. The trust state message 104 may include a message indicating that the firmware of the first computing device 100 is operating a trusted environment, as described above. That is, in response to the first computing device 100 undergoing a reset and secure booting into a trusted environment, the processor 102 may generate a trust state message 104 that communicates that the first computing device 100 in operating a trusted environment.

The trust state message 104 may be a message to be sent to a controller 106 of the first computing device 100. The trust state message 104 may be communicated to the controller 106 via a message communication channel. For example, the controller 106 may be communicatively coupled to the processor 102 via a shared memory interface message communication channel. The trust state message 104 may be communicated to the controller 106 via a shared memory interface between the processor 102 and the controller 106. In some examples, the trust state message 104 generated by the processor 102 may be communicated to the controller 106 by placement of the trust state message 104 in a non-volatile embedded controller random access memory (ECRAM) of the controller 106. The controller 106 may be to accept an initial message received over the shared memory interface after a reset. That is, although such communication channels may be considered insecure, the communication channel may be secured by virtue of the controller 106 being limited to accepting the first trust state message 104 that is received after a reset of the first computing device 100.

The controller 106 may receive the trust state message 104. The trust state message 104 may be a first or initial message received via the communication channel following a reset of the first computing device 100. The controller 106 may, responsive to receiving the trust state message, assert a trust state signal 108 to the second computing device 110. The trust state signal 108 may be include a signal asserted over a general-purpose input/output (GPIO) pin communicable connected to the second computing device 110. The second computing device 110 may usually sit at a certain bus such as USB I2C, etc. which may be a primary channel. However, the trust state signal 108 may be communicated to the second computing device 110 via an out of band (OOB) channel such as a GPIO pin that differs from the primary interface between the first computing device 100 and the second computing device 110.

The trust state signal 108 may include a signal that indicates to the second computing device 110 that the firmware of the first computing device 100 is being executed by the processor 102 such that the first computing device 100 is operating in the trusted environment. That is, the trust state signal 108 may include a signal asserted over a GPIO pin to indicate to a second computing device that the first computing device 100 has performed a secure boot and is operating in a trusted environment. The trust state signal 108 may remain persistently and/or periodically asserted to the second computing device 110 while the firmware of the first computing device continues to operate in the trusted environment. That is, as long as the first computing device 100 is operating the trusted environment, then the trust state signal indicating to the second computing device remains asserted to the second computing device 110, indicating the same.

As described above, the processor 102 may execute the firmware to validate machine-readable instructions, such as a firmware update to be applied to the first computing device 100 and/or the second computing device 110, within the trusted environment established at the first computing device 100. For example, the processor 102 may execute the firmware of the first computing device 100 to verify a digital signature of a firmware update package received at the first computing device 100. Once the update is validated by the firmware of the first computing device 100, the processor 102 may initiate the installation of the update to the first computing device 100. Once the update is validated by the firmware of the first computing device 100, the processor 102 may signal the validation to the second computing device 110.

The validation of the update by the first computing device 100 along with the assertion of the trust state signal 108 to the second computing device 110 may enable the second computing device 110 to install the validated update. For example, the second computing device 110 may rely on the validation of the firmware of the first computing device 100, signaled to the second computing device 110, in tandem with the assertion of the trust state signal 108 indicating that the validation was performed within the trusted environment at the first computing device 100. Therefore, once validated by the firmware of the first computing device 100, an update may be installed at the first computing device 100 and at the second computing device 110, so long as the trust state signal 108 is asserted by the controller 106 to the second computing device 110 during the installation.

Once an update has been installed to the first computing device 100 and/or the second computing device 110, the first computing device 100 may be prepared to leave the trusted environment and/or to boot an OS at the first computing device 100. As such, the processor 102 may generate a second trust state message before exiting the trusted environment. That is, the processor 102 may generate a second trust state message prior to scheduling a reset of the first computing device 100 to boot an OS of the first computing device 100. The second trust state message may include a close trusted update message. The close trusted update message may be sent to the controller 106. The close trusted update message may be an indication to the controller 106 that the first computing device 100 has or is going to leave the trusted environment. That is, the close trusted update message may indicate to the controller 106 that the first computing device 100 has completed a validation operation, has installed an update, and/or is ready to boot an OS of the first computing device 100.

The close trusted update message may be communicated to the controller via a shared memory interface and/or an ECRAM interface associated with the controller 106. The controller 106 may receive the close trusted update message. The close trusted update message may be scheduled to be sent before exiting the trusted environment and may be sent in such a manner that the controller 106 accepts the close trusted message as an initial message after reset to be acted on by the controller 106.

In response to receiving the close trusted update message, the controller 106 may de-assert the trust state signal 108. For example, the controller 106 may cause the trust state signal 108 to cease being asserted and/or change the state of the trust state signal 108 across the GPIO pin, responsive to receiving the close trusted update message. The de-assertion of the trust state signal 108 may disable the second computing device 110 from installing an update package. That is, since the assertion of the trust state signal 108 acts as an indication that the first computing device 100 is validating an update in a trusted environment and enables the second computing device 110 to install the validated update, de-asserting or changing the state of the trust state signal 108 may act to prevent the installation of an update since it may not be guaranteed that the first computing device 100 verified the update in the trusted environment.

Figure 2:
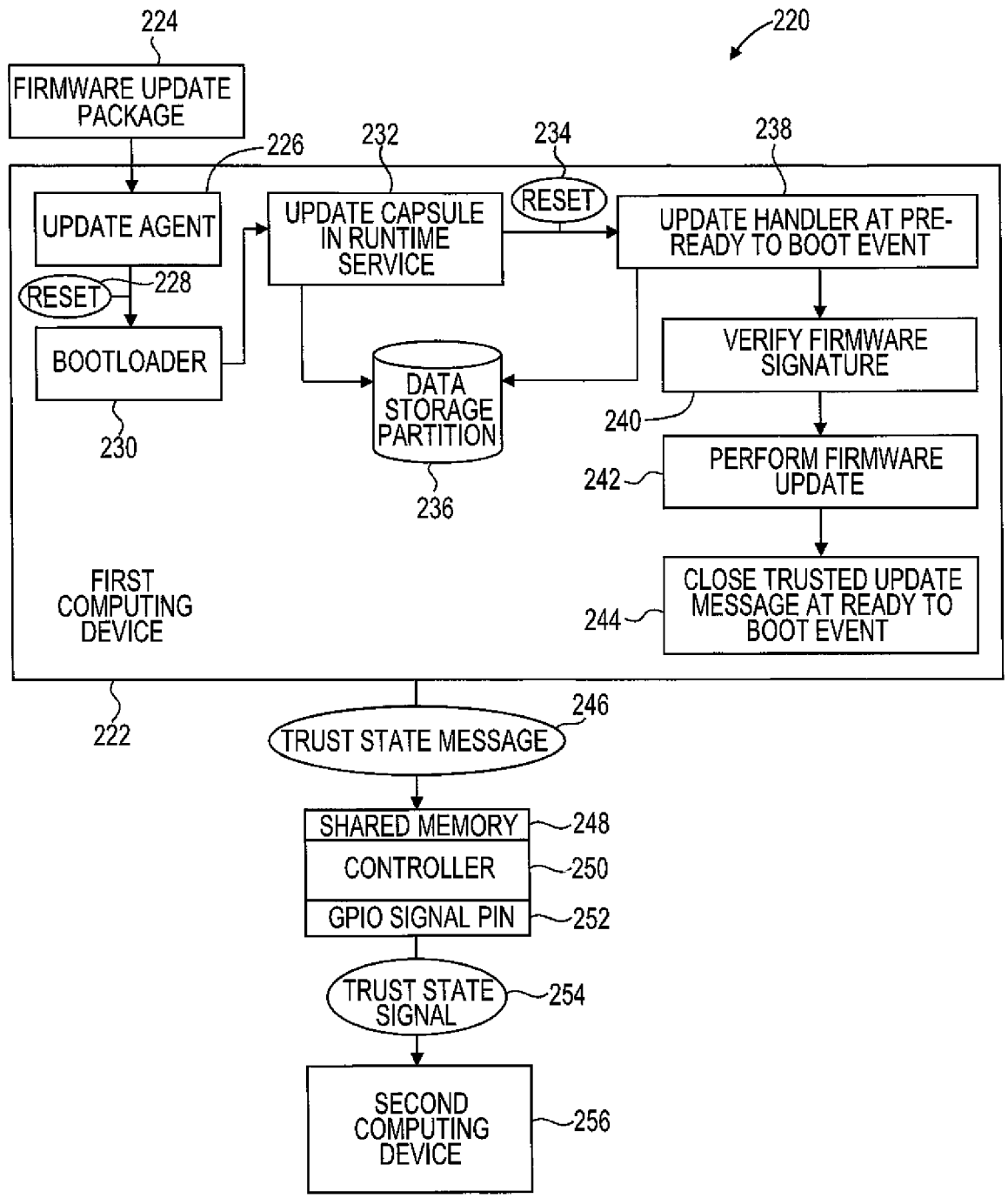
FIG. 2 illustrates an example of a system utilizing update signals consistent with the present disclosure.

FIG. 2 illustrates an example of a system 220 utilizing update signals consistent with the present disclosure. The described components and/or operations of the system 220 may include and/or be interchanged with the described components and/or operations described in relation to FIGS. 1 and 3-4.

The system 220 may include a firmware update package 224. The firmware update package 224 may include a set of machine-readable instructions to modify and/or replace a portion of a firmware associated with the first computing device 222. The firmware update package 224 may include a binary file containing a system firmware image to install at the first computing device 222.

The firmware update package 224 may be received by a first computing device 222. The firmware update package 224 may be sent to the first computing device 222 from another computing device. The first computing device 222 may be a host computing device. That is, the first computing device 222 may be a computing device of a plurality of computing devices to receive the firmware update package 224 in a computing network. The first computing device 222 may include a computing device that may be in charge of validating the firmware update package 224 for the computing network and/or distributing the firmware update package 224 to other computing device in the computing network.

The first computing device 222 may include a processor and machine-readable instructions executable by the processor to perform various functions. These instructions may include instructions such as firmware instructions, OS instructions, etc.

The first computing device 222 may launch an update agent 226. The update agent 226 may include a set of machine-readable instructions executable by the processor of the first computing device 222 to automatically trigger and/or support update delivery and installation. The update agent 226 may scan the first computing device 222 to determine what updates have been installed and then search for and download the firmware update package 224 from manufacturers website. In some examples, the update agent 226 may be launched responsive to receiving the firmware update package 224. The update agent 226 may detect, download, and/or install updates. The update agent 226 may include an application program interface that allows client computers to connect to update servers and/or update websites. The update agent 226 may check for and install updates daily. The update agent 226 may download firmware update package 224 from an update service server. The update agent 226 may install available updates from an update service server to the first computing device 222.

The update agent 226 may trigger a first reset 228 of the first computing device 222. The first reset 228 may be triggered responsive to receiving or retrieving the firmware update package 224. Following the first reset 228, a processor of the first computing device 222 may execute instructions to launch a boot loader 230. The bootloader 230 may include a set of instructions to initiate a secure boot and being the process of establishing a trusted environment at the first computing device 222.

The bootloader 230 may process the received firmware update package 224 utilizing a UEFI Update Capsule function to hand-off the firmware update package 224 payload to the firmware of the first computing device 222 for processing. That is, the first computing device 222 may package the firmware update package into an update capsule 232 in runtime service. The update capsule 232 may be the vehicle by which the firmware update package 224 is passed to the firmware of the first computing device 222. The firmware of the first computing device 222 may recognize a firmware update package 224 payload as the update capsule 232 and initiates the update process.

The firmware instructions of the first computing device 222 may be executable to save the update capsule 232 to a data storage partition 236. For example, the update capsule 232 may be saved to an Extensible Firmware Interface system partition (ESP) that may be a system partition on a data storage device of the first computing device 222. The data storage partition 236 may be formatted with a file system having a specification that is based on a file allocation table (FAT) file state and maintained as part of a UEFI specification. The data storage partition 236 may include a partitioned portion of a data storage resource where EFI boot loaders for the installed system and/or instructions utilized by the firmware of the first computing device 222 at startup.

The processor of the first computing device 222 may, subsequent to the update capsule 232 being saved in the data storage partition 236, trigger a second reset 234 of the first computing device 222. The second reset 234 may act as a trigger for the UEFI firmware to take control of the first computing device 222 and establish and maintain a secure boundary in the first computing device 222 within which to perform subsequent operations. The second reset 234 may be considered the event that establishes the secure environment. Operations of the first computing device 222 occurring subsequent to the second reset 234 and prior to the close trusted update message 244, described in detail below, may be considered to be occurring within the secure boundaries of the trust environment established by the firmware of the first computing device.

Responsive to the second reset 234 and/or the establishing of the trusted environment by execution of the firmware at the first computing device 222, a trust state message 246 may be generated 246. A trust state message 246 may include a message communicable to a controller 250. The controller 250 may include a controller embedded within the first computing device 222 and/or a controller external to but communicably coupled to the first computing device 222.

The trust state message 246 may include a message that communicates to the controller 250 whether the first computing device is executing in a trusted environment. For example, the trust state message 246 may include a message establishing that the firmware of the first computing device 222 has taken control of the first computing device 222 and established a secure trusted environment establishing a root of trust to validate the firmware update package 234.

The trust state message 246 may be communicated to the controller 250 via saving the trust state message 246 to a shared memory resource 248. The share memory resource 248 may include a memory to which access is shared between the first computing device and the controller 250. In some examples, the shared memory 248 may include ECRAM associated with the controller 250.

Responsive to receiving the trust state message 246 indicating that the first computing device 222 is operating in a trusted environment, the controller 250 may cause a trust state signal 254 to be asserted and/or to change the state of the trust state signal 254 asserted over a GPIO signal pin 252. A GPIO may include a signal pin on an integrated circuit or electronic circuit board. The behavior of the signal pin, including whether the signal pin acts as input or output, may be controllable by instructions or by a user at runtime.

The GPIO signal pin 252 may include a signal pin that interfaces with and/or is communicably coupled to a second computing device 256. As such, a signal, such as the trust state signal 254, may be asserted to the second computing device 256. The second computing device 256 may be a device other than the first computing device 222 that is present in a same computing network as the first computing device 222. The second computing device 256 may include a computing device that lacks the capability to establish a trusted environment and/or lacks the hardware and/or instructions to validate a firmware update package 224 independently. That is, the second computing device 256 may lack a crypto-engine and/or an accelerator utilizable to validate a firmware update package prior to installation to the second computing device 256.

However, the boundaries of the trusted environment operating at the first computing device 222 may be extended to include the second computing device 256 by implementing the communication of the trust state signal 254 to the second computing device 256. That is, assertion of a trust state signal 254 to the second computing device 256 by the controller 250 may establish a chain of trust between the first computing device 222 and the second computing device 256 relating to the validation of the firmware update package 224. For example, the second computing device 256 may be assured that the first computing device 222 in performing a validation operation for a firmware update package 224 while operating in a trusted environment so long as the trust state signal 254, indicating to the second computing device 256 that the first computing device 222 is operating in the trusted environment, is asserted. In this manner, the assertion of the trust state signal 254 indicating that the that the first computing device 222 is operating in the trusted environment may enable the second computing device 256 to rely on the validation of the firmware update package 224 by the first computing device 222. As such, the assertion of the trust state signal 254 indicating that the that the first computing device 222 is operating in the trusted environment may enable the second computing device 256 to install the firmware update package 224 at the second computing device 256 without performing an independent validation of the firmware update package 224.

Returning to the function of the first computing device 222 following the second reset 234, execution of the device firmware of the first computing device 222 may initiate an update handler 238. The update handler 238 may retrieve the update capsule 232 from the data storage partition 236. The update handler 238 may retrieve and load the update capsule 232 from the data storage partition 236 at a pre-ready to boot event. A pre-ready to load event may refer to an event that occurs prior to the firmware of the first computing device 222 reaching a post validation/installation state where the first computing device 222 is ready to boot.

The firmware of the first computing device 222 may be executed to validate the firmware update package while operating in the trusted environment. For example, the firmware of the first computing device 222 may be executed to perform a cryptographic digital signature verification 240 operation on the firmware update capsule 232 retrieved from the data storage partition 236.

Once a successful validation of the firmware update package 224 is complete, the processor of the first computing device 222 may execute instructions to perform the firmware update 242. Performing the firmware update 242 may include installing the firmware update package 224 at the first computing device 222. Additionally, performing the firmware update 242 may include sending a message and/or other signal to the second computing device 256 that the firmware update package 224 validation is complete and/or was successful. In some examples, performing the firmware update 242 may include installing the firmware update 242 at the second computing device 256. The second computing device 256 may permit the installation of the firmware update package 224 on the condition that the message and/or other signal that the firmware update package 224 validation is complete and/or was successful is received at the second computing device 256 and/or that the trust state signal 254 indicating that the first computing device 222 is operating in the trusted environment is asserted to the second computing device 256.

Following the verification of the firmware signature 240 and/or the performance of the firmware update 242, the processor of the first computing device 222 may execute instructions to generate another trust state message 246. However, in such examples, the trust state message 246 to be generated and/or sent to the controller 250 may be a close trusted update message 244. The close trusted update message 244 may be generated and/or sent at a ready to boot event. That is, the close trusted update message 244 may be generated and/or sent when the firmware of the first computing device 222 has verified firmware signature 240 and/or completed a firmware update 242 installation and is ready to boot, for example, an OS of the first computing device 222. The close trusted update message 244 may be generated and/or scheduled to be sent when the first computing device is preparing to boot resulting in the first computing device leaving and/or ceasing to operate the trusted environment.

Therefore, a trust state message 246, such as a close trusted update message 244, may be communicated to the controller 250. For example, the close trusted update message 244 may be communicated to the controller 250 by placing the close trusted update message 244 in a shared memory 248. The close trusted update message 244 may indicate to the controller 250 that the first computing device 222 is leaving and/or has left the trusted environment.

Responsive to receiving the trust state message 246, including the close trusted update message 244, the controller 250 may de-assert or modify the state of the trust state signal being asserted to the second computing device 256 across the GPIO signal pin 252. The de-assertion and/or modification of the state of the trust state signal 254 may indicate to the second computing device 256 that the first computing device 222 that the first computing device 222 is leaving and/or has left the trusted environment. As such, the de-assertion and/or modification of the state of the trust state signal 254 may disable the second computing device 256 from installing subsequent firmware update packages that may be received while the trust state signal 254 is de-asserted or asserted in the modified state. That is, the second computing device 256 may not permit installation of a firmware update package when the trust state signal 254 is de-asserted or asserted in the modified state. The second computing device 256 may not permit installation of a firmware update package until the trust state signal 254 is reasserted or a state of the trust state signal 254 is modified once again. In this manner, the trust boundary of the trusted environment established by the first computing device 222 is extended to the second computing device 256 for the purposes of firmware validation by making the permission to install a firmware update to the second computing device 256 contingent upon validation of firmware by the first computing device 222 and/or assertion of the trust state signal 254 to the second computing device 256 during validation.

Figure 3:
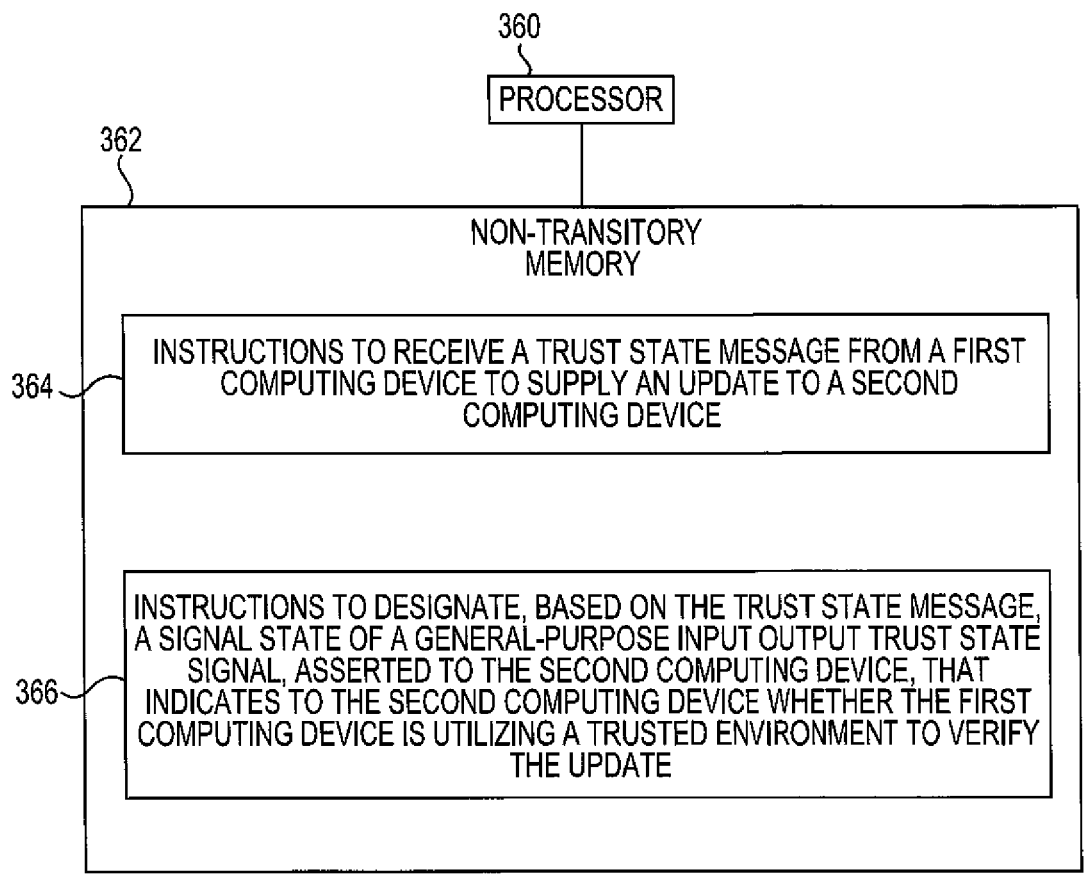
FIG. 3 illustrates and example of a non-transitory machine-readable memory and processor for utilizing update signals consistent with the present disclosure.

FIG. 3 illustrates and example of a non-transitory machine-readable memory 362 and processor 360 for utilizing update signals consistent with the present disclosure. A memory resource, such as the non-transitory memory 362, may be used to store instructions (e.g., 364, 366, etc.) executed by the processor 360 to perform the operations as described herein. The operations are not limited to a particular example described herein and may include and/or be interchanged with the described components and/or operations described in relation to FIGS. 1-2 and 4.

The processor 360 may include a processor and/or application specific integrated circuit associated with and/or incorporated into a controller. In some examples, the controller may be a controller embedded into and/or communicably coupled to a first computing device. The first computing device may include a host device for validating firmware updates to be applied to a second computing device.

The non-transitory memory 362 may store instructions 364 executable by the processor 360 to cause the controller to receive and/or retrieve a trust state message from the first computing device. In examples, the first computing device may include a computing device that is to supply an update to a second computing device. For example, a first computing device may include an administrative device that received a firmware update and validates the update for and/or distributes the updates to various other computing devices associated with the first computing device.

The trust state message may include a message generated by a processor of the first computing device that indicates to the controller that the first computing device has entered and/or is utilizing a trusted environment to verify an update it has received. The update may be an update that is applicable to and/or installable at a second computing device communicably coupled to the controller.

The trust state message may be sent from the first computing device to the controller via a shared memory interface between the two. That is, the trust state message may be saved into a shared memory resource or partition such as an ECRAM that is commonly accessibly between the first computing device and the second computing device.

The generating, sending, receiving, and/or retrieving of the trust state message to the controller may be triggered by a reset and/or a scheduling of a reset at the first computing device. For example, the sending and/or retrieving of the trust state message to the controller may be triggered by a reset marking a transition, caused by execution of firmware at the first computing device, of the first computing device into a trusted environment.

In some examples, the trust state message may include a close trusted update trust state message. The close trusted update trust state message may be generated by a processor of the first computing device and may indicate to the controller that the first computing device is leaving and/or has left a trusted environment. In some examples, the close trusted update message trust state message may include a message generated by a processor of the first computing device that indicates to the controller that the first computing device is ready to leave a trusted environment to boot an OS of the first computing device.

The close trusted update trust state message may be sent from the first computing device to the controller via a shared memory interface between the two. That is, the close trusted update trust state message may be saved into a shared memory resource or partition such as an ECRAM that is commonly accessibly between the first computing device and the second computing device.

The generating, sending, receiving, and/or retrieving of the close trusted update trust state message to the controller may be triggered by a reset and/or a scheduling of a reset at the first computing device. For example, the sending and/or retrieving of the close trusted update trust state message to the controller may be triggered by scheduling and/or executing a reset to boot an operating system. As such, the sending and/or retrieving of the close trusted update trust state message to the controller may be triggered by scheduling and/or executing a reset marking a transition of the first computing device out of a trusted environment.

The non-transitory memory 362 may store instructions 366 executable by the processor 360 to cause the controller to designate a signal state of a GPIO trust state signal asserted to a second computing device. The signal state of the GPIO trust state signal and/or even if the trust state signal is asserted at all may be based on the trust state message received by the controller.

Therefore, based on the trust state message, indicating to the controller whether the first computing device is operating in a trusted environment or not, the controller may designate a corresponding state of a trust state signal that may be asserted to the second computing device across the GPIO pin. As such, the state of the signal asserted to the second computing device across the GPIO pin may indicated to the second computing device whether the first computing device is utilizing a trusted environment to verify the update.

For example, the controller may receive a first trust state message, indicating that the first computing device is operating in a trusted environment, issued from the first computing device following a reset of the first computing device. Responsive to receiving the first trust state message, the controller may cause the modification of a state of a trust state signal to a first state at a GPIO pin communicably coupled to a second computing device. The modification of the trust state signal to the first state may enable the second computing device to install a validated firmware package validated by the first computing device operating in the trusted environment.

In another example, the controller may receive a second trust state message, indicating that the first computing device is leaving or has left a trusted environment, issued from the first computing device prior a reset of the first computing device to boot an OS. Responsive to receiving the second trust state message, the controller may cause the modification of a state of a trust state signal to a second state at a GPIO pin communicably coupled to a second computing device. The modification of the trust state signal to the second state may disable the second computing device from installing firmware packages, designated as validated or otherwise, in the absence of the trust state signal in the first state.

Figure 4:
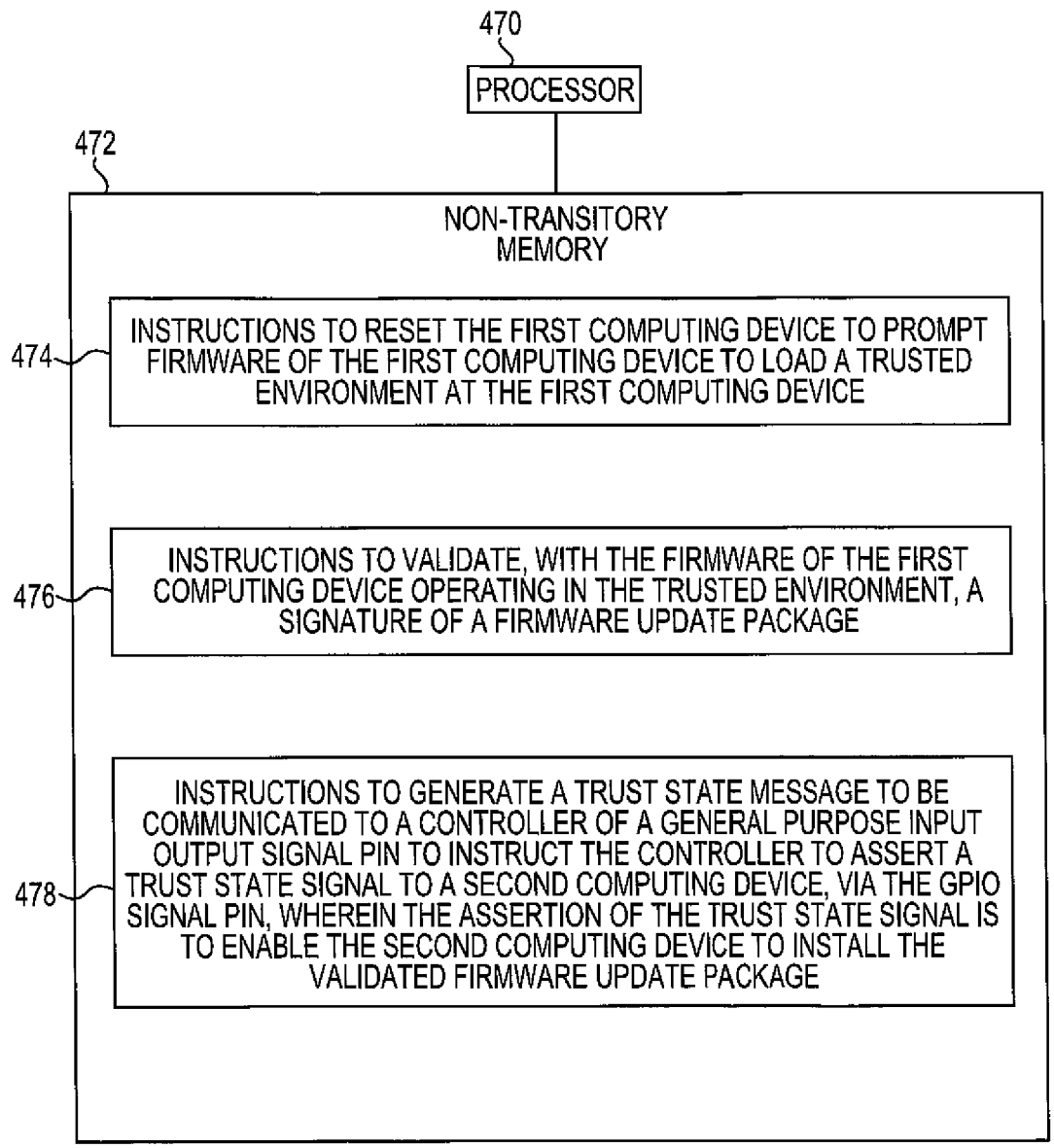
FIG. 4 illustrates and example of a non-transitory machine-readable memory and processor for utilizing update signals consistent with the present disclosure.

FIG. 4 illustrates and example of a non-transitory machine-readable memory 472 and processor 470 for utilizing update signals consistent with the present disclosure. A memory resource, such as the non-transitory memory 472, may be used to store instructions (e.g., 474, 476, 478, etc.) executed by the processor 470 to perform the operations as described herein. The operations are not limited to a particular example described herein and may include and/or be interchanged with the described components and/or operations described in relation to FIGS. 1-3.

The processor 470 may include a processor and/or application specific integrated circuit associated with and/or incorporated into a first computing device. In some examples, the first computing device may be communicably coupled to a controller and/or have a controller embedded within the first computing device. The first computing device may include a host device for validating firmware updates to be applied to a second computing device.

The non-transitory memory 472 may store instructions 474 executable by the processor 470 to cause the first computing device to reset the first computing device. The reset may be a reset to prompt firmware of the first computing device to load a trusted environment at the first computing device. The reset may include a reset occurring and/or being triggered subsequent to storing an update capsule, generated from a firmware update package, to an extensible firmware interface system (ESP) partition associated with the first computing device.

The non-transitory memory 472 may store instructions 474 executable by the processor 470 to cause the first computing device to validate, with the firmware of the first computing device operating in the trusted environment, a digital signature of the firmware update package. Validating the digital signature of the firmware update package may include retrieving, with the firmware of the first computing device executing in the trusted environment, the update capsule from the ESP partition. A signature validation operation may be performed on the retrieved update capsule to validate the signature of the firmware update package. For example, a cryptographic verification of the digital signature of the firmware update package utilizing public and/or private keys may be performed on the update capsule.

The non-transitory memory 472 may store instructions 476 executable by the processor 470 to cause the first computing device to generate a trust state message to be communicated to a controller of a GPIO signal pin. The trust state message may be generated and communicated to the controller via a shared memory interface. The trust state message may include an instruction to the controller to assert, to a second computing device, a trust state signal via the GPIO pin. The assertion of the trust state signal over the GPIO pin to the second computing device may enable the second computing device to install the validated firmware update package that was validated by the first computing device.

Once the first computing device has completed a verification operation and/or installed a validated firmware update package, the first computing device may reach a ready to boot event. A ready to boot event may include an event, in a sequence of events specified by the execution of UEFI-based firmware of the first computing device, instigating a reset that marks the departure of the first computing device from the trusted environment. For example, the ready to boot event may be an event where the first computing device is ready to exit the trusted environment and boot an OS.

Responsive to reaching the ready to boot event, the first computing device may generate a close trusted update message. The close trusted update message may be a trust state message to be communicated to a controller via a shared memory interface. The close trusted update message may include instructions to the controller to de-assert the trust state signal to the second computing device. The de-assertion of the trust state signal may be to disable the second computing device from installing a second firmware update package. That is, the second computing device may not permit the installation of a firmware update package in the absence of an asserted trust state signal.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A first computing device comprising:
   firmware;
   a controller comprising a nonvolatile embedded controller random-access memory (ECRAM); and
   a processor in communication with the controller and the firmware, wherein the processor is to:
   generate a trust state message, to be sent to the controller, indicating the firmware of the first computing device is operating a trusted environment, and
   utilize the firmware to validate an update within the trusted environment;
   wherein, responsive to receiving the trust state message, the controller is to:
   assert a general-purpose input/output (GPIO) trust state signal to a second computing device, wherein the assertion of the GPIO trust state signal is to enable the second computing device to install the update validated utilizing the firmware;
   designate a signal state of the GPIO trust state signal asserted to the second computing device, wherein the signal state of the GPIO trust state signal indicates the firmware of the first computing device is operating the trusted environment; and
   wherein, responsive to receiving a close trusted update trust state message, the controller is to modify the signal state of the GPIO trust state signal, wherein the close trusted update trust state message is issued from the first computing device via the ECRAM, and wherein the close trusted updated message indicates the first computing device is ready to boot an operating system.

2. The first computing device of claim 1, wherein the firmware of the first computing device is a unified extensible firmware interface (UEFI) based firmware.

3. The first computing device of claim 1, wherein the trust state signal remains asserted by the controller while the firmware of the first computing device is operating the trusted environment.

4. The first computing device of claim 1, wherein the processor is to execute the firmware of the first computing device to validate the update by verifying a digital signature associated with the update.

5. The first computing device of claim 1, wherein the controller is to de-assert the trust state signal responsive to receiving a second trust state message, generated by the processor, indicating the first computing device is ready to boot an operating system (O/S) of the first computing device.

6. The first computing device of claim 1, wherein the controller is communicatively coupled to the processor via a shared memory interface, wherein the controller is to accept an initial message received over the shared memory interface after a reset.

7. A non-transitory machine-readable medium including instructions, that when executed by a controller, cause the controller to:

receive a trust state message from a first computing device to supply an update to a second computing device;

designate, based on the trust state message, a signal state of a general-purpose input/output (GPIO) trust state signal asserted to the second computing device, wherein the signal state of the GPIO trust state signal indicates to the second computing device whether the first computing device is utilizing a trusted environment to verify the update; and modify the state of the GPIO trust state signal responsive to receiving a close trusted update trust state message, wherein the close trusted update trust state message is issued from the first computing device via a nonvolatile embedded controller random-access memory (ECRAM), indicating the first computing device is ready to boot an operating system.

8. The non-transitory machine-readable medium of claim 7, further including instructions when executed cause the controller to modify the state of the GPIO trust state signal responsive to receiving a second trust state message, issued from the first computing device following a reset, indicating the first computing device is operating in the trusted environment.

9. A non-transitory machine-readable medium including instructions when executed cause a processor of a first computing device to:

reset the first computing device to prompt firmware of the first computing device to load a trusted environment at the first computing device;

validate, with the firmware of the first computing device operating in the trusted environment, a signature of a firmware update package;

generate a trust state message to be communicated to a controller of a general purpose input/output (GPIO) signal pin to instruct the controller to assert a trust state signal to a second computing device, via the GPIO signal pin, wherein the assertion of the trust state signal is to enable the second computing device to install the validated firmware update package, and wherein the controller comprises a nonvolatile embedded controller random-access memory (ECRAM);

designate a signal state of the GPIO trust state signal asserted to the second computing device, wherein the signal state of the GPIO trust state signal indicates the firmware of the first computing device is operating the trusted environment; and generate, responsive to the first computing device reaching a ready to boot event, a close trusted update message to be communicated to the controller, wherein the close trusted update message indicates the first computing device is ready to boot an operating system.

10. The non-transitory machine-readable medium of claim 9, further including instructions when executed cause the processor of the first computing device to store an update capsule, generated from the firmware update package, to an extensible firmware interface system (ESP) partition associated with the first computing device.

11. The non-transitory machine-readable medium of claim 10, further including instructions when executed cause the processor of the first computing device to:

retrieve, with the firmware of the first computing device executing in the trusted environment, the update capsule from the ESP partition; and perform a signature validation operation on the retrieved update capsule to validate the signature of the firmware update package.

12. The non-transitory machine-readable medium of claim 11 wherein the close trusted update message to be communicated to the controller instructs the controller to de-assert the trust state signal to the second computing device.

13. The non-transitory machine-readable medium of claim 9, wherein the de-assertion of the trust state signal is to disable the second computing device from installing a second firmware update package.

* * * * *